US012587820B2

(12) United States Patent
Dutta et al.

(10) Patent No.: US 12,587,820 B2
(45) Date of Patent: Mar. 24, 2026

(54) FREQUENCY RANGE 2 (FR2) NON-STANDALONE SIDELINK DISCOVERY

(71) Applicant: QUALCOMM Incorporated, San Diego, CA (US)

(72) Inventors: Sourjya Dutta, San Diego, CA (US); Kapil Gulati, Belle Mead, NJ (US); Hong Cheng, Basking Ridge, NJ (US); Junyi Li, Chester, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 17/117,772

(22) Filed: Dec. 10, 2020

(65) Prior Publication Data

US 2022/0191673 A1 Jun. 16, 2022

(51) Int. Cl.
*H04W 8/00* (2009.01)
*H04B 7/06* (2006.01)
(Continued)

(52) U.S. Cl.
CPC .......... *H04W 8/005* (2013.01); *H04B 7/0617* (2013.01); *H04B 7/06954* (2023.05); *H04W 72/0453* (2013.01); *H04W 74/0833* (2013.01)

(58) Field of Classification Search
CPC ............. H04W 8/005; H04W 72/0453; H04W 74/0833; H04B 7/0617
See application file for complete search history.

(56) References Cited

U.S. PATENT DOCUMENTS 11,764,856 B2 * 9/2023 Dutta .................... H04W 48/14
                                                      370/329
2009/0238156 A1 * 9/2009 Yong .................... H04B 7/0491
                                                      455/500
(Continued)

FOREIGN PATENT DOCUMENTS

WO         2019138283 A1    7/2019
WO    WO-2022089642 A1 *    5/2022    ............ H04W 72/20

OTHER PUBLICATIONS

ETSI "5G; NR; User Equipment (UE) radio access capabilities" 3GPP TS 38.306, version 16.1.0, Sep. 2020 (Year: 2020).*
(Continued)

*Primary Examiner* — Chuong M Nguyen
(74) *Attorney, Agent, or Firm* — QUALCOMM Incorporated

(57) ABSTRACT

Aspects of the present disclosure provide apparatus, methods, processing systems, and computer readable mediums for non-standalone sidelink discovery. A user equipment (UE) may be capable to operate in two or more separate frequency ranges. In one of the separate frequency ranges, sidelink discovery may require a burdensome overhead due to the nature of beam forming at high frequency ranges. Communications in another lower frequency range may signal to aid the discovery, thus reducing the overhead. For example, the UEs may use the low frequency communication to perform a beam alignment and discovery with lower signaling overhead. In addition, the UE may signal the capability in a first frequency range using signatures or indications in a communication in a second frequency range. For example, the UE may use FR2 to signal FR1 capability, such as using beam pilots as signatures to indicate FR1 capability.

23 Claims, 12 Drawing Sheets

(51) Int. Cl.
　　*H04W 72/0453*　　　(2023.01)
　　*H04W 74/0833*　　　(2024.01)

(56) References Cited

U.S. PATENT DOCUMENTS

| | | | | |
|---|---|---|---|---|
| 2017/0142703 A1* | 5/2017 | Xue | ...................... | H04W 8/005 |
| 2018/0014341 A1* | 1/2018 | Jung | ................... | H04W 56/002 |
| 2018/0049016 A1* | 2/2018 | Adachi | ................. | H04W 48/16 |
| 2018/0212651 A1* | 7/2018 | Li | ...................... | H04B 7/06958 |
| 2019/0081751 A1* | 3/2019 | Miao | ................... | H04L 25/0224 |
| 2019/0090293 A1* | 3/2019 | Su | ......................... | H04W 76/14 |
| 2020/0252990 A1* | 8/2020 | Ganesan | ............ | H04B 7/06966 |
| 2020/0322774 A1* | 10/2020 | Vargas | ................. | H04W 16/28 |
| 2021/0127381 A1* | 4/2021 | Ryu | ..................... | H04L 1/1607 |
| 2021/0168574 A1* | 6/2021 | Zhang | ................... | H04L 5/0048 |
| 2021/0212051 A1* | 7/2021 | Raghavan | ............ | H04W 8/005 |
| 2021/0392717 A1* | 12/2021 | Ryu | ..................... | H04W 76/28 |

OTHER PUBLICATIONS

International Search Report and Written Opinion—PCT/US2021/
056677—ISA/EPO—Feb. 23, 2022.

* cited by examiner

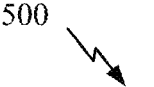
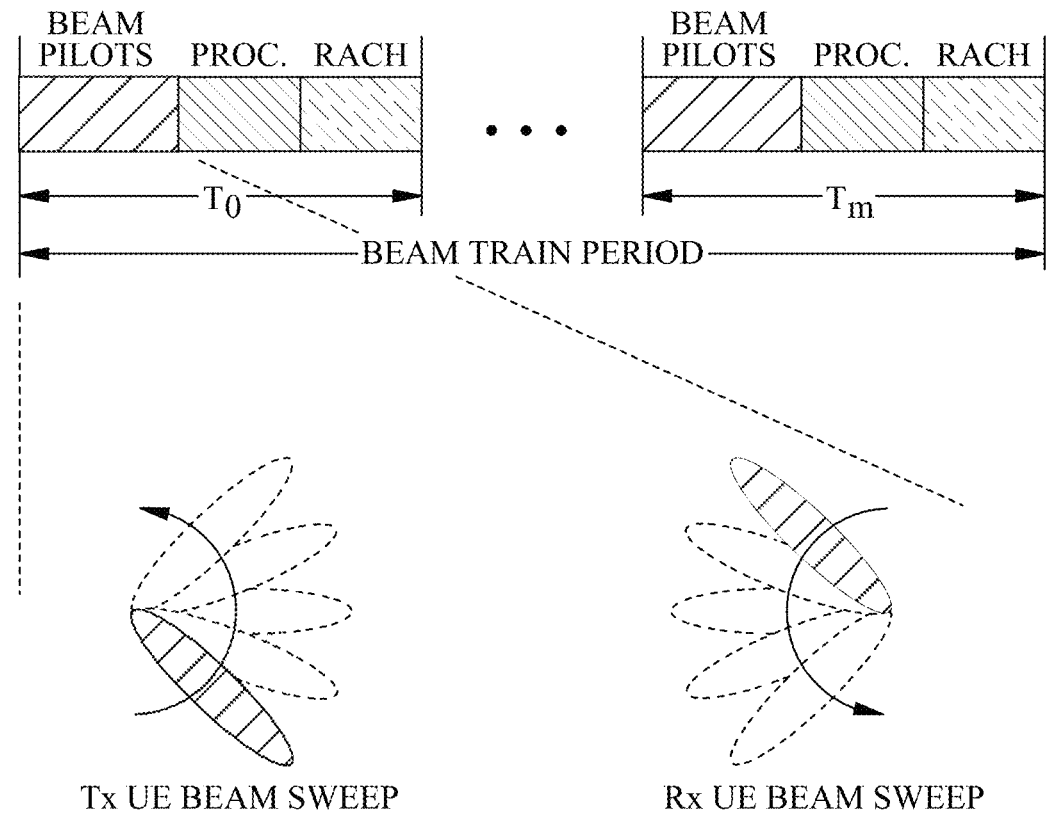
FIG. 5

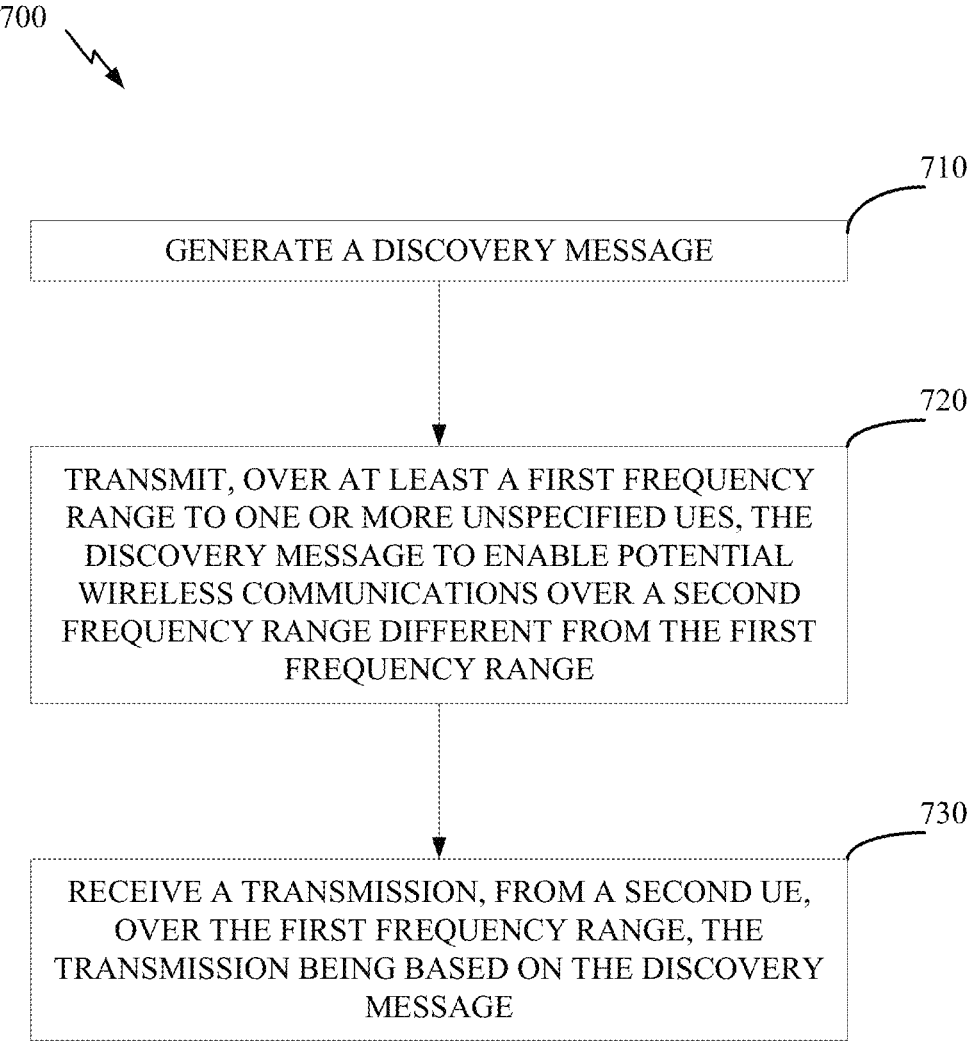

700

710

GENERATE A DISCOVERY MESSAGE

720

TRANSMIT, OVER AT LEAST A FIRST FREQUENCY RANGE TO ONE OR MORE UNSPECIFIED UES, THE DISCOVERY MESSAGE TO ENABLE POTENTIAL WIRELESS COMMUNICATIONS OVER A SECOND FREQUENCY RANGE DIFFERENT FROM THE FIRST FREQUENCY RANGE

730

RECEIVE A TRANSMISSION, FROM A SECOND UE, OVER THE FIRST FREQUENCY RANGE, THE TRANSMISSION BEING BASED ON THE DISCOVERY MESSAGE

PROVIDE AN INDICATION OF SEQUENCES ASSOCIATED WITH A FIRST FREQUENCY RANGE TO A SECOND UE, SAID SEQUENCES BEING USED FOR BEAM TRAINING

820

INDICATE A CAPABILITY ASSOCIATED WITH A SECOND FREQUENCY RANGE TO THE SECOND UE

900

910

RECEIVE ONE OR MORE TRANSMISSIONS FROM A TRANSMITTER UE OVER A FIRST FREQUENCY RANGE

920

DETECT, BASED ON THE ONE OR MORE TRANSMISSIONS, A BEAM-TRAINING SEQUENCE INDICATING A COMMUNICATION CAPABILITY ASSOCIATED WITH A SECOND FREQUENCY RANGE OUTSIDE OF THE FIRST FREQUENCY RANGE

930

PERFORM ONE OR MORE ACTIONS OVER THE SECOND FREQUENCY RANGE

FREQUENCY RANGE 2 (FR2) NON-STANDALONE SIDELINK DISCOVERY

BACKGROUND

Field of the Disclosure

Aspects of the present disclosure relate to wireless communications, and more particularly, to techniques for sidelink communication and beam management.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved feedback signaling.

Certain aspects provide a method for wireless communications by a user-equipment (UE). The method generally includes generating a discovery message; transmitting, over at least a first frequency range to one or more unspecified UEs, the discovery message to enable potential wireless communications over a second frequency range different from the first frequency range; and receiving a transmission, from a second UE, over the first frequency range, the transmission being based on the discovery message.

Certain aspects provide a method for wireless communications. The method generally includes providing an indication of sequences associated with a first frequency range to a second UE, said sequences being used for beam training; and indicating a capability associated with a second frequency range (e.g., Frequency Range 1) to the second UE.

Certain aspects provide a method for wireless communications. The method generally includes receiving one or more transmissions from a transmitter UE over a first frequency range (e.g., Frequency Range 2); detecting, based on the one or more transmissions, a beam-training sequence indicating a communication capability associated with a second frequency range (e.g., Frequency Range 1) outside of the first frequency range; and performing one or more actions over the second frequency range.

Aspects of the present disclosure provide UEs, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates an example beam training period between two UEs in sidelink communication, in accordance with certain aspects of the present disclosure.

FIG. 7 is a flow diagram illustrating example operations for wireless communication, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
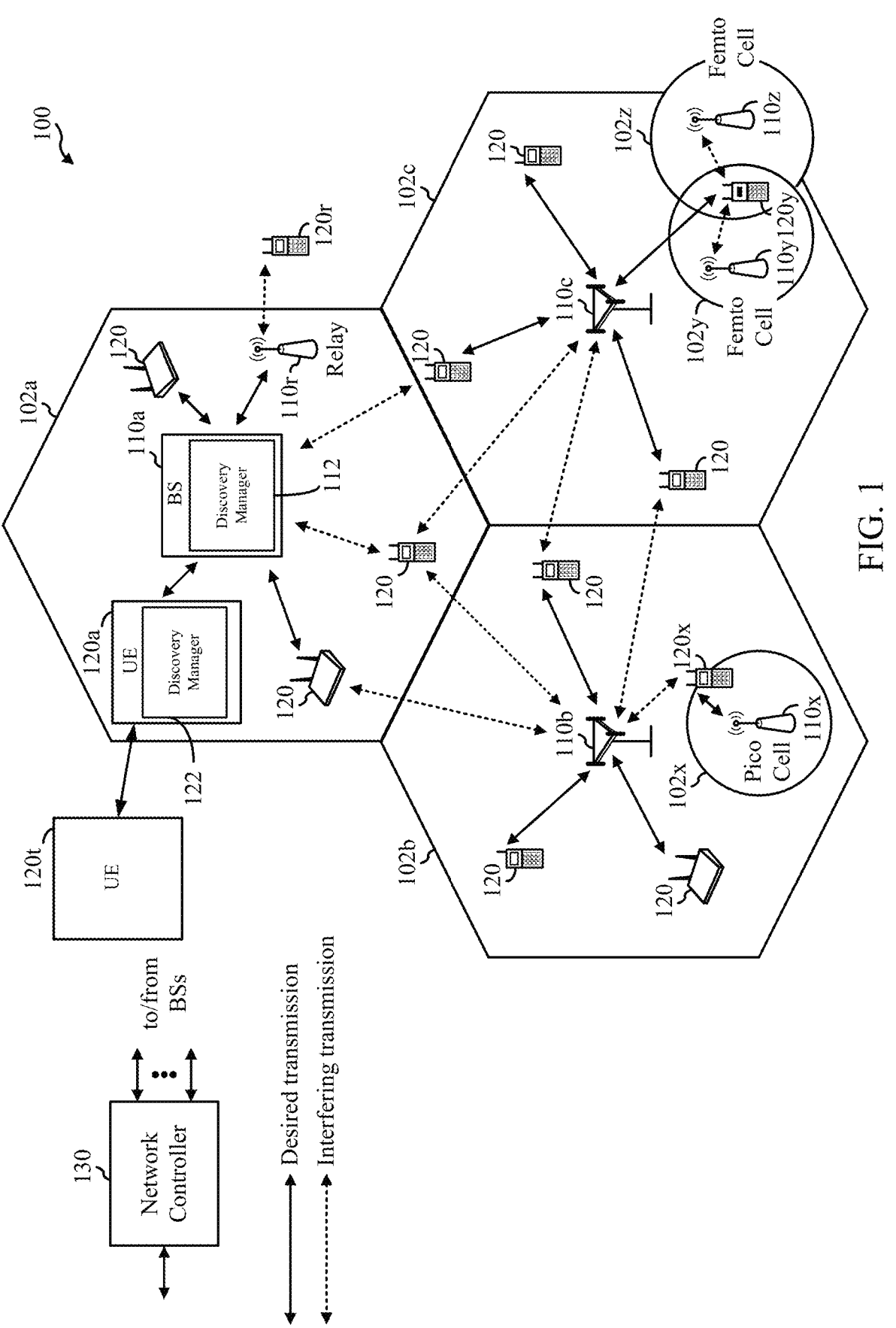
FIG. 1 is a block diagram conceptually illustrating an example telecommunications system, in accordance with certain aspects of the present disclosure.

Aspects of the present disclosure provide apparatus, methods, processing systems, and computer readable mediums for non-standalone sidelink discovery. For example, a user equipment (UE) may be capable to operate in two or more separate frequency ranges, such as FR1 and FR2 (i.e., FR1: 410 MHz to 7.125 GHz; FR2: 24.25 GHz through 52.6 GHz). In one of the separate frequency ranges, sidelink discovery may require a burdensome overhead due to the nature of beam forming at high frequency ranges (e.g., millimeter waves). In such cases, communications in another lower frequency range may signal to aid the discovery, thus reducing the overhead. For example, the UEs may use the low frequency communication to perform a beam alignment and discovery with lower signaling overhead.

In certain aspects, the UE may signal the capability in a first frequency range using signatures or indications in a communication in a second frequency range. For example, the UE may use FR2 to signal FR1 capability, such as using beam pilots as signatures to indicate FR1 capability. As such, the situations where an FR2 capable UE not being aware of FR1 capability of its peer may be avoided. In addition, FR1 may be used as a fallback when FR2 is not available, such as during blockage events and other similar cases. The FR1 link may also be used to exchange control messages, such as radio resource control (RRC) or application layer control.

The following description provides examples of configurations for SL communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. In some cases, the UE 120a may establish sidelink communication with the UE 120t, which may or may not be covered by another cell or base station, such as the macro cell 102a or the base station 110a. As further discussed in various examples below, the UE 120a and 120t may establish sidelink communications using millimeter waves, without relying on the base station 110a.

According to certain aspects, the UEs 120 may be configured to perform discovery operations. As shown in FIG. 1, the UE 120a includes a discovery manager 122. The discovery manager 122 may be configured to perform discovery operations for reselection of a relay UE, as described in more detail herein. The BS 110 may also include a discovery manager 112. The discovery manager 112 may configure resources for relay selection using discovery messages, as described in more detail herein.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
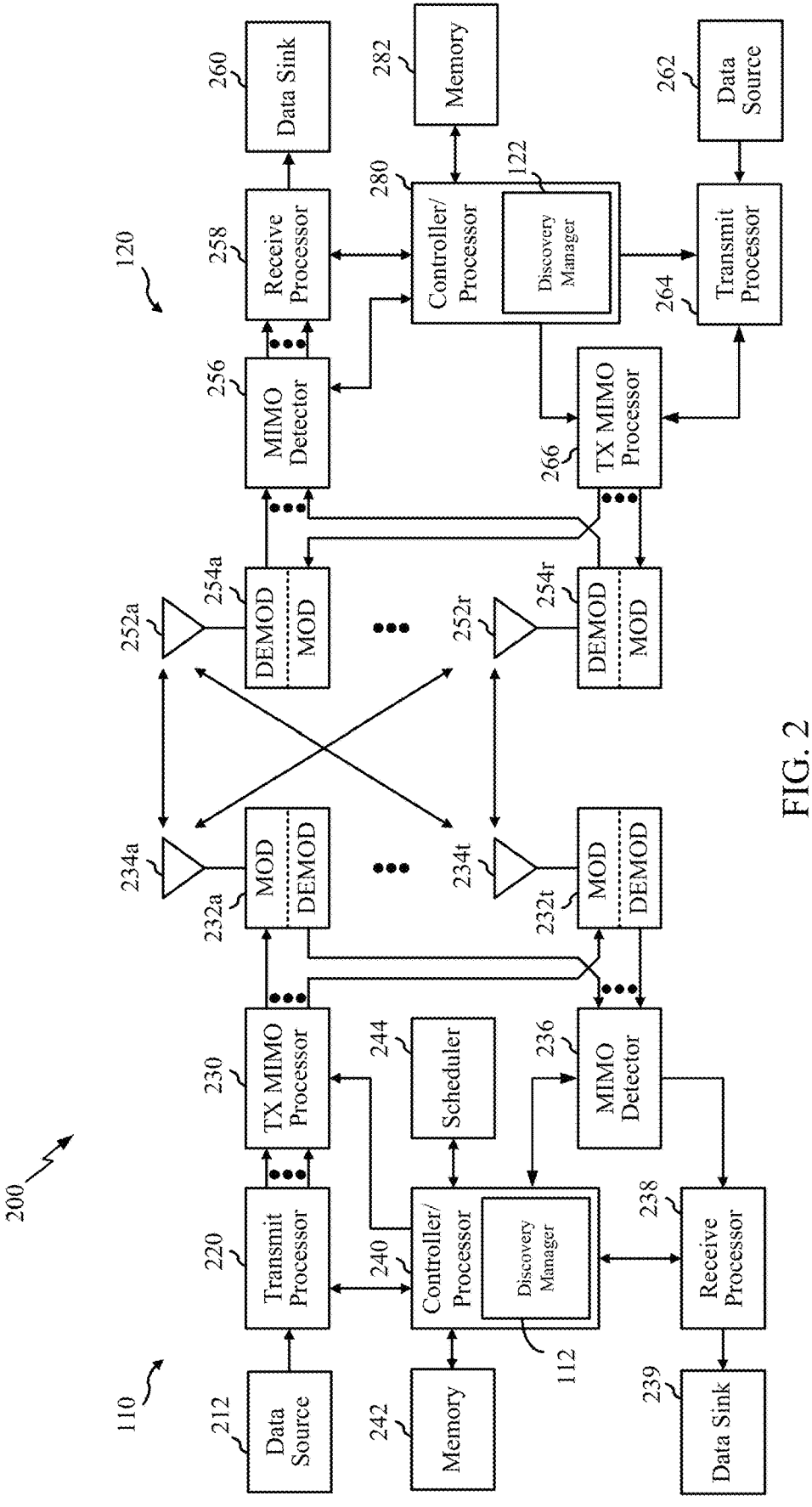
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the discovery manager 122, and the controller/processor 280 of the BS 110 has the discovery manager 112. Although shown at the Controller/Processor, other components of the UE 120a may be used performing the operations described herein.

Figures 3A, 3B:
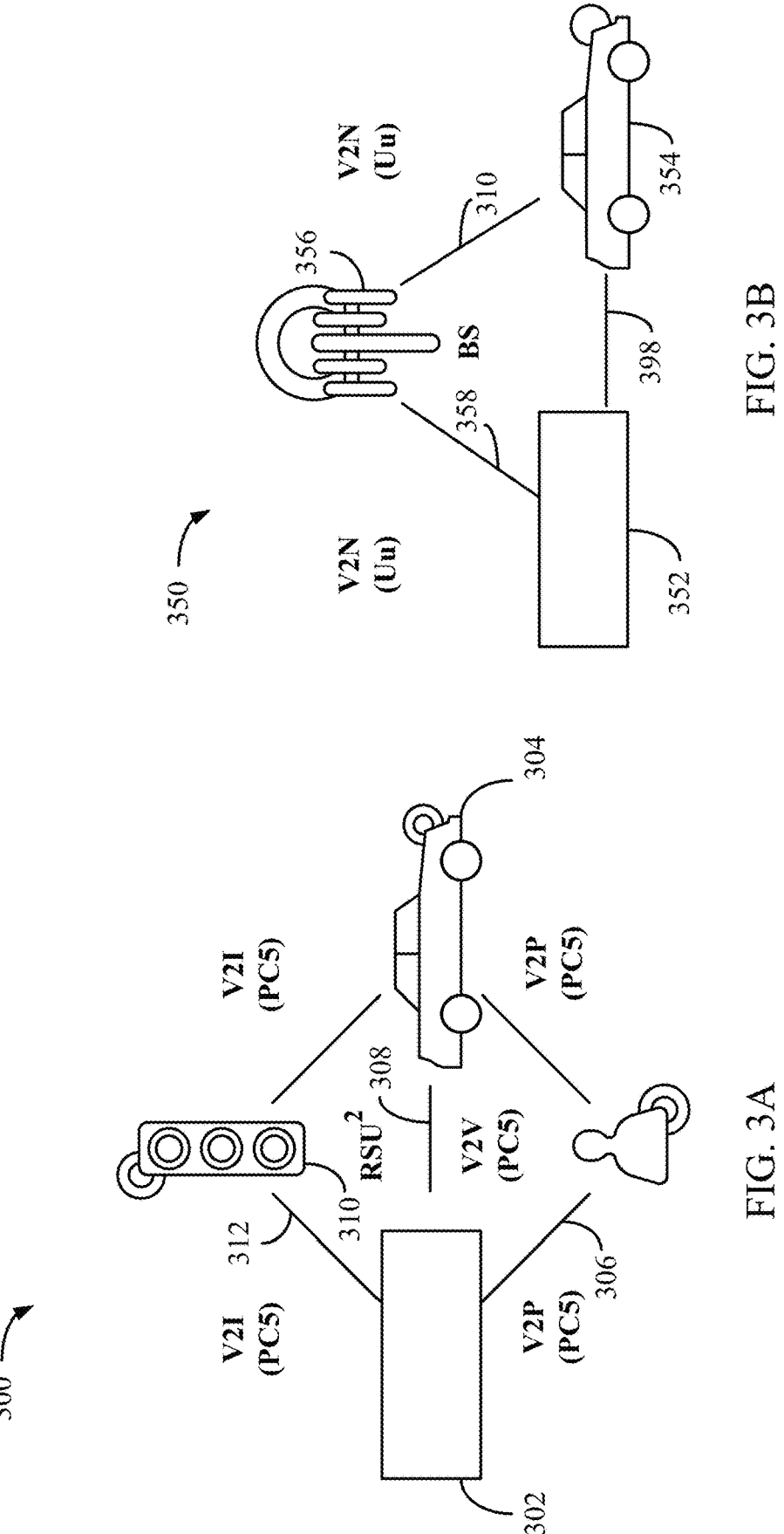
FIGS. 3A and 3B show diagrammatic representations of example vehicle to everything (V2X) systems in accordance with some aspects of the present disclosure.

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Discovery Techniques for Sidelink Beam Training

For long-term evolution (LTE), discovery pool and communication pool may be separately configured in a radio resource control (RRC) reconfiguration message, system information block (SIB), or may be preconfigured (e.g., in a standard). For example, common communication pools may be provided in LTE SIB18, and common discovery pools may be provided in LTE SIB19, for UE's in idle mode of operation. A common pool of resources generally refers to resources available to multiple UEs for a particular purpose (e.g., data communication or discovery). Common communication and discovery pools may be separately provided in pre-configuration for out-of-coverage (OOC) UEs. Dedicated communication and discovery pools may be separately provided in RRC reconfiguration message for UEs in a connected mode of operation. A dedicated pool of resources generally refers to resources dedicated to a particular UE for communication or discovery.

In some cases, transmit (TX) and receive (RX) pools may be configured. For example, a common TX pool may be configured in SIB or preconfigured. The common TX pool may be overwritten by dedicated configuration via RRC reconfiguration message. RX pool may always be common across UEs for LTE, and may be only provided (e.g., configured) via RRC message upon handover (HO) from one cell to another. An RX pool may be agnostic to the RRC state of the UE. In some implementations, dedicated assignment of resources may only be configured for a TX pool.

There are various differences between discovery and communication pools. For example, sidelink control information (SCI) may not be used for discovery messages. Both communication and discovery pools may be defined by a periodic subframe pool of resources in time domain and periodic pool of resource blocks (RBs) in frequency domain. Communication pool and discovery pool may share the same RB pool definition in LTE. For example, the bandwidth for discovery and communication pools may be 2 RB to 200 RB, and the start position of the pools of resources may be configurable. For a communication pool, separate frequency allocations may be defined for control and data transmissions. The communication pool and discovery pool may use different periodicity configurations. For instance, the periodicity of communication pool may be 40 ms to 320 ms, but the periodicity for discovery pool may be 320 ms to 10.24 seconds. In other words, communication pools may be denser than discovery pools.

Figure 4A:
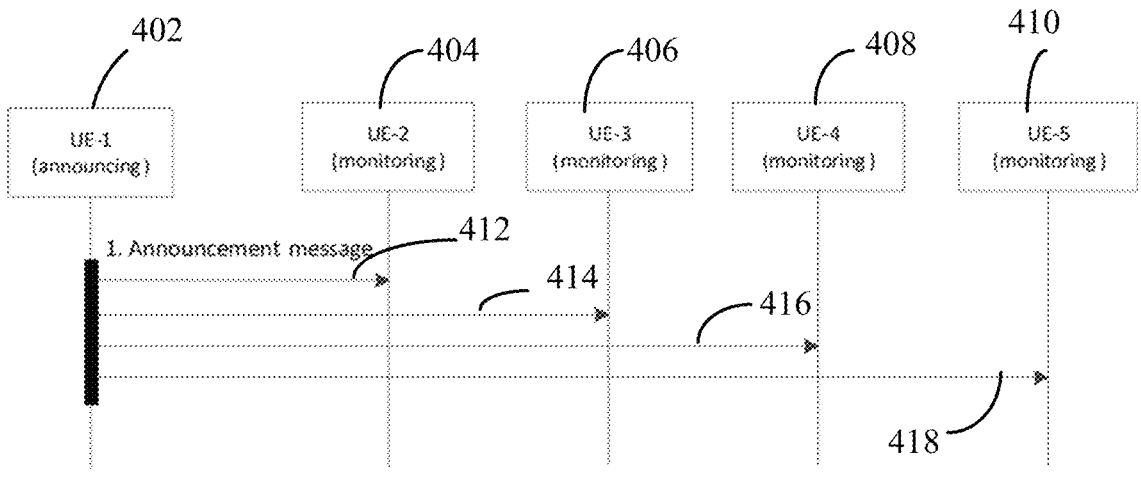
FIGS. 4A and 4B illustrate messages for discovery in sidelink.
Figure 4B:
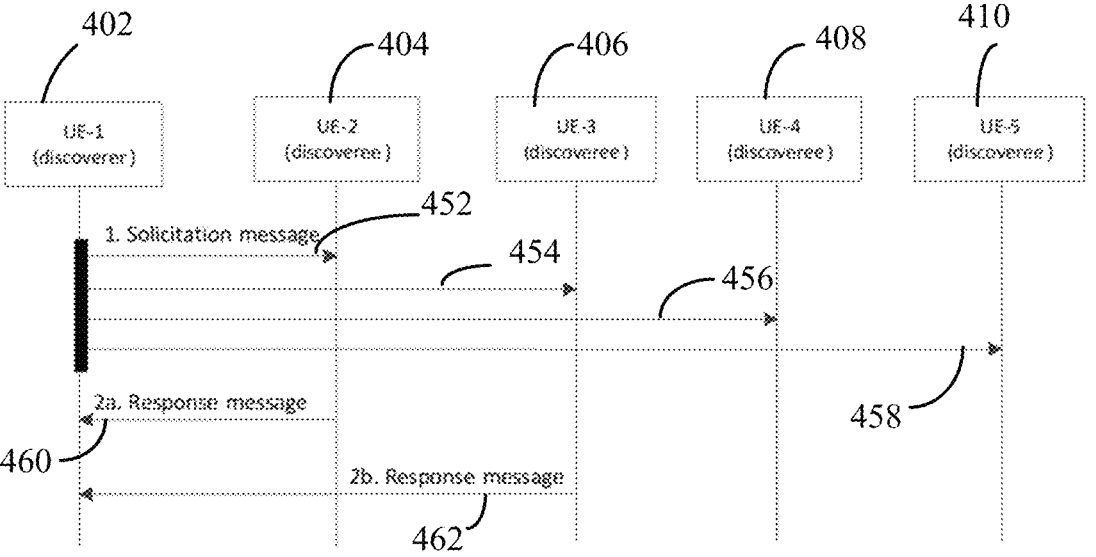

FIGS. 4A and 4B illustrate messages for discovery in sidelink. FIG. 4A illustrates a discovery protocol referred to as "Model A" discovery. As illustrated, UE 402 may transmit announcement messages 412, 414, 416, 418 (also referred to as "discovery announcement" below) using a pool of resources configured for discovery. The announcement messages may be received by other UEs 404, 406, 408, 410 that may be monitoring for the announcement messages. The announcement messages may be sent in a PC5 communication channel, as described with respect to FIG. 3. Once received, one or more of the announcement messages may be used for the UE 402 to connect with one or more of UEs 404, 406, 408, 410.

FIG. 4B illustrates a discovery protocol referred to as "Model B" discovery. As illustrated, UE 402 may be a discoverer UE and may be transmitting solicitation messages 452, 454, 456, 458 (also referred to as "discovery advertisement" below). The solicitation messages may be received by one or more UEs 404, 406, 408, 410. For example, as illustrated, UE 404 and UE 406 may transmit response messages 460, 462 back to UE 402 to facilitate connection on sidelink. For instance, the UE 402 may perform channel measurements to select one of the UEs 404, 406 having the highest link quality, and perform connection establishment with the selected UE.

In some cases, for sidelink communications over the Frequency Range 2 (FR2, e.g., including frequency bands from 24.25 GHz to 52.6 GHz, also known as millimeter wave range), or similar frequency range that requires directional links as transmissions and are subject to high path loss (attenuation), therefore, beamforming is required to enable communications over a practical range to mitigate the directional nature of the high frequency beams. Such beamforming requires exhaustive beam search and periodic beam training for maintenance, burdening energy efficiency and overhead.

In addition, sidelink FR2 communications may be more challenging due to the practical scenario where many UEs may form beam pair links (BPLs) with each other, unlike the beamforming situation with a base station (including for the Uu link in sidelink) where each UE needs only to form a BPL with one base station (gNB). Due to this distributed nature of the network, system-wide resources need to be allocated for beam training (especially for standalone FR2 discoveries). These resources are periodic. The UEs may transmit beam training reference signals (BT-RSs) over beam training occasions. Each BT-RS is generated based on a sequence such as a reference signal sequence. The receiver (Rx) UEs may detect the BT-RSs and send feedback (e.g., random access channel, "RACH") on the dominant beam. The beam training is performed as an exhaustive beam search where both the transmitter (Tx) and the receiver (Rx) sweep 360-degrees using N beams (making the total search requiring N×N beam pairs).

Once the Tx UE and the Rx UE have established possible BPLs through the beam scan, the UEs may perform a device discovery to establish communications for various applications. The device discover enables the UEs to know the peers' UE identifiers (ID) (e.g. layer 2 ID).

FIG. 5 illustrates an example beam training period between two UEs in sidelink communication, in accordance with certain aspects of the present disclosure. As shown, the beam training period includes a number of training cycles $T_0, T_1, \ldots T_m$. Each of the training cycle Tm may include three events: (1) transmitting a number of beam pilots in multiple directions; (2) processing the beam pilots to identify a direction of a desirable signal strength; and (3) sending a random access channel (RACH) sequence on the identified direction. Completing the beam training would enable the Tx UE and the Rx UE aware of the dominant beam directions.

For example, the Tx UE on the bottom left of FIG. 5 may first transmit multiple pilot beams in various directions, such as exhaustively over 360 degrees. The Rx UE on the bottom right of FIG. 5 may similarly perform a beam sweep. Upon completion of beam sweep, the Rx UE determines a dominant direction for every BT-RS or a sequence such as reference signal sequence or BT-RS sequence received from the Tx UE. Each Tx UE may have an orthogonal BT-RS. The Rx UE then processes the beam pilots and transmits a RACH sequence on the dominant directions to the Tx UE.

In order to have the Tx UE and the Rx UE discover each other, the UEs must associate a BPL to the other UE. This discovery allows the UEs to identify the devices and upper layer services. Because the FR2 links often have high overhead to establish and maintain, it is beneficial for the UEs to establish and/or maintain trained or paired links for relevant services as such operations may save time that is often consumed by creating and tearing down unnecessary links.

The present disclosure enables transmissions of discovery messages on device level and service level discoveries. The discovery message may also include beamforming information for reception and future beam association or directional communications. Due to the directional nature of millimeter waves, such as links at FR2, broadcasting discovery messages or allocating system wide resources for them can have prohibitively high overheads.

In some cases, the discovery message may include the device ID of the UE. The current and possible future device locations may also be included in the discovery message. For example, the location information may be gathered by the UE based on the current zone ID and the UE's direction of motion and/or acceleration. The location or change of location of the Tx UE may be used by the Rx UE to determine the Tx UE's trajectory.

In some cases, the discovery message may include one or a list of application layer service IDs. The discovery message may also include meta data for one or more of the services listed in the service ID. The discovery message may further include beam and directional information. For example, the discover messages may indicate the beam training pilot used by this UE for current and future beam training periods, In some cases the discovery message will also contain the beam training occasions that the Tx UE uses in the future beam training periods. The UE may also send a time domain division (TDD) pattern for the beam corresponding to one directional discovery message. The TDD pattern is used by the receiver to transmit the discovery response. The UE receiving the discovery message searches for a PSSCH resources in the slots indicated in the TDD pattern to transmit the discovery response.

The device and service information may be used by the UEs to manage the beamformed links. In one case, the service ID and the meta data is used to accept or reject the discovery advertisement/discovery announcement. The Rx UE may reject the discovery message if it does not support the service. The Rx UE may infer that the service information from the Tx UE is not relevant. For example, information from a vehicle (i.e., a Rx UE in a V2X sidelink scenario) behind the Tx UE on another lane may be irrelevant and not used by the Rx UE. In one case, the service ID, meta data, with the device location and trajectory may be used to accept/reject discovery.

In view of the device-service specific discovery message discussed above, the Model A discovery and Model B discovery discussed in FIGS. 4A-4B may each exhibit the following characteristics. In Model A discovery, the Rx UE may transmit one or more RACH to the Tx UE during the beam training period. The Rx UE also transmits a discovery advertisement over each direction it had sent a RACH on. The discovery advertisement may contain a BT-RS sequence ID used by the Tx UE for beam training. The discovery advertisement may also include one or more future beam training occasions within a BT period. The discovery advertisement is transmitted over the PSSCH (as further discussed in FIG. 6), and may be made using shared channel resource reservation procedure. The receiver (e.g., the Tx UE) of the discovery advertisement may send a discovery response. In some cases, when the Tx UE receives the discovery advertisement and is not interested, the Tx UE may still send a discovery response indicating rejection. In some cases, the Tx UE may not send any discovery response regarding the received discovery advertisement.

In Model B discovery, the Tx UE that has transmitted the beam training pilots may send discovery message in the direction that the Tx UE receives a RACH from the Rx UE. The Tx UE transmits a discovery announcement to the Rx UE, which, upon receiving the discovery announcement, determines whether to discover on a device or a service level the Tx UE based on the UE ID or service ID indicated in the discovery announcement. If the Rx UE determines that the device or service is of interest, the Rx UE may transmit a discovery response based on the time domain division (TDD) pattern of the discovery announcement.

Example Techniques for Sidelink FR2
Non-Standalone Discovery

Certain aspects of the present disclosure include techniques for generating a discovery message, transmitting, over at least a first frequency range to one or more unspeci-
fied UEs, the discovery message to enable potential wireless
communications over a second frequency range different
from the first frequency range; and receiving a transmission,
from a second UE, over the first frequency range, the
transmission being based on the discovery message.

Certain aspects of the present disclosure include tech-
niques for providing an indication of sequences associated
with a first frequency range to a second UE, said sequences
being used for beam training; and indicating a capability
associated with a second frequency range (such as FR1) to
the second UE.

Certain aspects of the present disclosure include tech-
niques for receiving one or more transmissions from a
transmitter UE over a first frequency range (such as FR2);
detecting, based on the one or more transmissions, a beam-
training sequence indicating a communication capability
associated with a second frequency range (such as FR1)
outside of the first frequency range; and performing one or
more actions over the second frequency range.

As discussed above, because of inherent path loss at high
frequency ranges (such as FR2), wireless links often require
beamforming and spatial filtering to achieve sufficient range.
In relatively low frequency ranges (such as FR1), links may
be transmitted omnidirectionally or with wide beams, such
that beamforming is not needed. Prior to any communication
over FR2 links, the communicating nodes need to perform
an initial beam alignment. One widely employed method is
to perform an initial exhaustive search for the nodes to
configure a beam pair link (BPL). In cases involving mul-
tiple UEs, each sidelink UE may form multiple BPLs with
other sidelink UEs (or peer UEs). The involved beam
discovery process may thus have a higher overhead than the
beam discovery process between a UE and a base station
(such as gNB or eNB in a Uu link).

Figure 6:
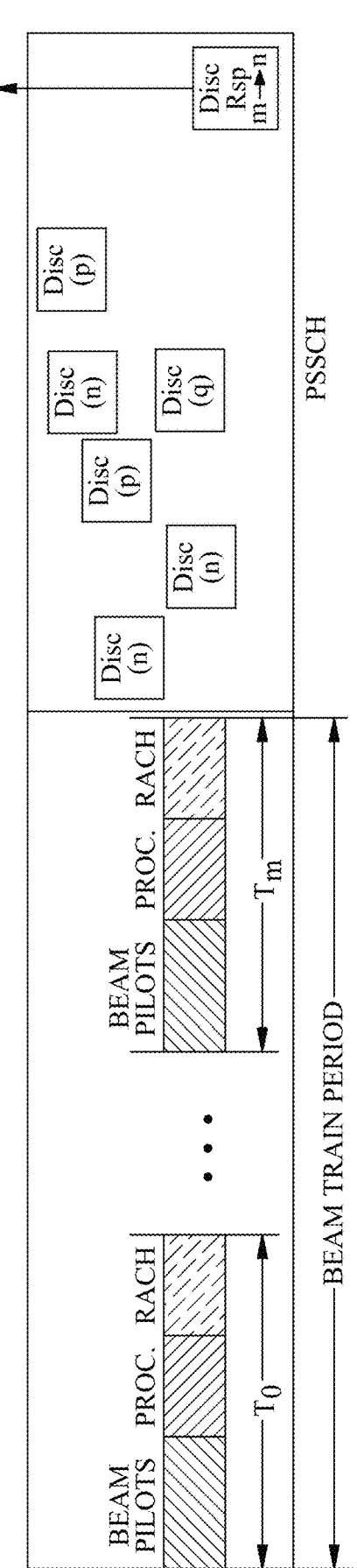
FIG. 6 illustrates an example re-discovery procedure using sidelink communication between two UEs, in accordance with certain aspects of the present disclosure.

FIG. 6 illustrates an example discovery procedure using
sidelink communication between two UEs, in accordance
with certain aspects of the present disclosure. As shown,
discoveries using PSSCH are performed after the beam
training period. During the beam training period, system-
wide resources may be used for beam discovery. The beam
training process may use a long beam training period that
repeats over a large time scale. For example, a beam training
period of 100 ms may repeat for every second, resulting in
a 10% overhead. By comparison, a 5 ms beam training
period may be used every 20 ms synchronization period for
beam training for a Uu link between a UE and a base station.

An initial BPL may be established after the beam training
period. The Tx UE and the Rx UEs may then use the PSSCH
to transmit and/or receive beam discovery messages for
device and service discoveries. As shown, various discovery
events may occur in PSSCH. For beam discovery for stand-
alone FR2, system wide resources for beam training are
employed. The time required to perform initial beam train-
ing may be considerably longer compared to Uu beam
training. That is, a long beam training period that repeats
over a large time scale may be used in such case. After the
establishment of the initial BPL, the UE may use the FR2
PSSCH to transmit or receive beam discovery announce-
ment or advertisement, respectively.

The present disclosure provides techniques for perform-
ing non-standalone sidelink discovery, such as in FR2 or
other frequency ranges that may require substantial over-
head during beamforming or beam training. In certain
aspects, a UE and some of its peers (e.g., other UEs) may
have both FR1 and FR2 capabilities. The FR2 beam dis-
covery may be considerably aided by FR1 signaling. In one case, part of the device discovery and service information is
sent over FR1. The UEs may use this information to perform
a FR2 beam alignment and beam discovery with lower
signaling overhead.

In certain aspects, the UE may use FR2 to signal FR1
capability, which may be used as a fallback when FR2 is no
longer available or aid for future FR2 beam training. For
example, FR2 can be used to indicate the presence of FR1
capability. The UE may use beam pilots as signatures for
indicating FR1 capability. As such, an FR2 capable UE may
avoid failing to become aware of FR1 capability of its peers.
The FR1 link may also be used to exchange control mes-
sages (RRC or application layer control).

For example, in some aspects, a UE may network with
both standalone and non-standalone UEs. For the UEs
having both FR1 and FR2 capabilities, the UEs may first
transmit an FR2 discovery advertisement/announcement
over FR1 bands. The peers in the network with FR1 con-
nection can reply to this discovery message over FR1. In
some cases, the discovery message over FR1 may contain
the device ID and other information (specific to Model A or
Model B operations).

In case of discovery announcement (Model A), the dis-
covery message may include an indication asking the UE to
notify about the beam training sequence and occasions in the
response. The discovery message may include the RACH
sequence the UIIE will use for FR2 beam training. In such
cases, the UE may listen on the direction(s) on which the UE
may receive the RACH to receive and decode a discovery
message. The UE that transmits the discovery message may
be referred to as the announcing UE. The UE that looks out
for the discovery message may be referred to as the moni-
toring UE. The monitoring UE may transmit the BT-RS to
the announcing UE. In some cases, the UE may include FR2
service ID and service meta data. Post the beam training, for
Model A, the transmitter may accept any further discovery
announcements. In one case, this is to accommodate SA
devices. In another case, UE may receive enhanced FR2
discovery information from peers. In other cases UE-s who
are discovered over FR2 the peers can directly start data
transmission.

In the case of discovery advertisement (Model B): the
discovery message includes the beam training sequence(s)
and beam training occasion(s) within the next N beam
training periods. The discovery message may also send an
indication to notify the RACH sequence to be used by the
peer for FR2 beam training response. In such Model B cases,
the UE transmits the discovery message on the direction(s)
on which it receives and decodes the RACH sequences. The
UE transmitting the discovery message may be referred to as
the discoverer UE, while the UE(s) that responds to the
discover message may be referred to as the discoveree UE.
The discoverer UE transmits the BT-RS generated from a
sequence such as a reference signal sequence or the actual
sequence to the discoveree UE. Post beam training, the
transmitter UE, similar to the cases in Model A, also
transmits the discovery announcement over FR2. In one
case, UE-s who have already been discovered may not try to
decode this and can start data Tx process. In another case,
additional FR2 information may be sent over this discovery
message relevant to all UEs.

In certain aspects of the present disclosure, FR1 capability
may be indicated using FR2 communications. In particular,
the FR2 beam training reference signal (BT-RS) sequence
can be used as a signature to indicate FR1 capability. For
example, this is configured as a system wide setting. A set of
sequences such as reference signal (RS) sequences or BT-RS sequences if being used for beam training is used for UEs with standalone FR2 capabilities. Another non-overlapping set of sequences is used for UEs with both FR1 and FR2 capabilities. In some cases, when more than one FR1 band is supported, a separate set of sequences may be used for each FR1 band. In response, when a FR2 receiver (Rx) UE detects a BT-RS sequence during beam training indicating FR1 capability, if the Rx UE does not have FR1 capability, the Rx UE disregards the signatures and treats the BT-RS pilots as is. On the other hand, if the Rx UE has FR1 capability and can RACH to the transmitting (Tx) UE, the Rx UE may continue FR2 operation and send FR2 discovery over FR1 only when FR2 link degrades. The Rx UE may also send an FR2 discovery over FR1 to create a backup link for the FR2 traffic or control.

In certain aspects, the Rx UE has FR1 capability and detects the BT-RS to have low power, such as when the reference signal received power (RSRP) is less than a threshold, the Rx UE may attempt direct FR2 discovery initially, and if the FR2 discovery fails, then attempt the FR2 discovery over FR1. Otherwise, if the FR2 discovery is successful, the UE continues with FR2 operations with the Tx UE. In some other cases, the Rx UE may avoid discovery over FR2 and initiate FR2 discovery over FR1.

FIG. 7 is a flow diagram illustrating example operations 700 for wireless communication, in accordance with certain aspects of the present disclosure. The operations 700 may be performed, for example, by a transmitter UE (e.g., such as the Tx UE in FIG. 5).

Operations 700 may be implemented as software components that are executed and run on one or more processors (e.g., controller/processor 280 of FIG. 2). Further, the transmission and reception of signals by the relay UE in operations 700 may be enabled, for example, by one or more antennas (e.g., antennas 252 of FIG. 2). In certain aspects, the transmission and/or reception of signals by the relay UE may be implemented via a bus interface of one or more processors (e.g., controller/processor 280) obtaining and/or outputting signals.

The operations 700 may begin, at block 710, by the Tx UE, generating a discovery message. At block 720, the UE transmits, over at least a first frequency range to one or more unspecified UEs, the discovery message to enable potential wireless communications over a second frequency range different from the first frequency range. At block 730, the UE receives a transmission, from a second UE, over the first frequency range, the transmission being based on the discovery message.

In certain aspects, the transmission received is based on the second UE discovering the first UE using the discovery message. The discovery message may include a device identifier (ID) of the first UE.

In certain aspects, generating the discovery message comprises including an indication that requests a notification about at least one of beam training sequence or one or more beam training occasions in a response from the second UE.

In certain aspects, generating the discovery message comprises including a random access channel (RACH) sequence to be used for beam training over the second frequency range.

In certain aspects, the Tx UE may accept one or more discovery announcements similar to the discovery message after beam training to accommodate standalone devices. The Tx UE may receive enhanced discovery information about the second frequency range from one or more unspecified UEs. The second UE may be one of the one or more unspecified UEs.

In certain aspects, generating the discovery message comprises including information regarding at least one of one or more beam training sequences or one or more beam training occasions for one or more beam training periods. The Tx UE may receive a set of beam training sequences from the second UE and communicate with the second UE based on the set of received beam training sequences. The Tx UE may transmit to the second UE an indication of a random access channel (RACH) sequence to be used for beam training over the first frequency range.

In certain aspects, the discovery message may include a discovery announcement; and the transmission of the discovery message is over the first frequency range.

In certain aspects, the Tx UE may receive a second transmission from a discovered UE, wherein the discovered UE has completed beam training with the first UE independent of the discovery message. The discovery announcement may include additional information relevant to one or more unspecified UEs post beam training.

Figure 8:
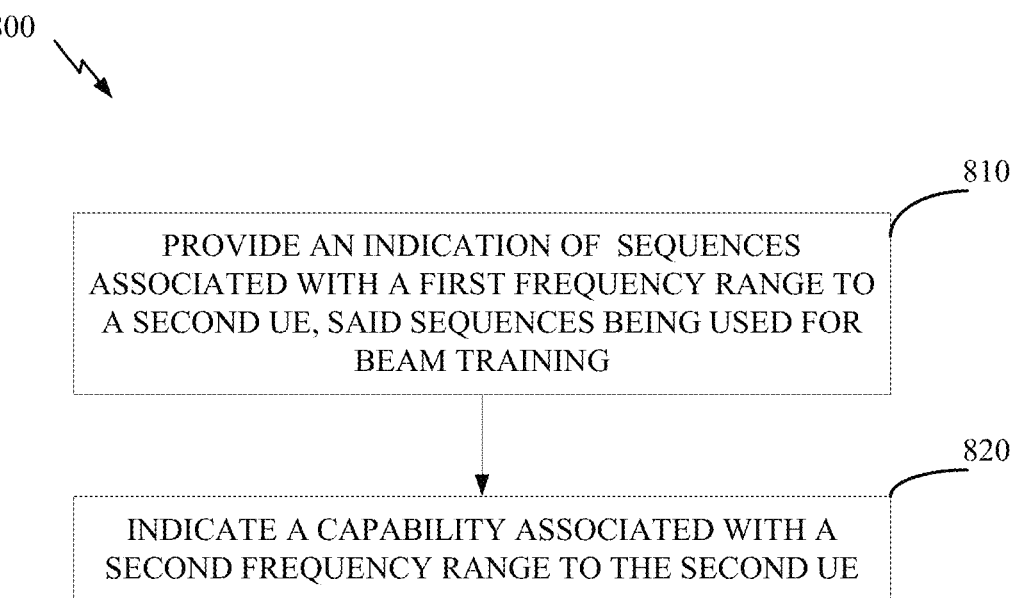
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a Tx or Rx UE (e.g., such as the Tx UE or the Rx UE in FIG. 5). The operations 800 may be complementary to the operations 700 of FIG. 7 when the Tx UE and the Rx UE discovers each other in sidelink using mm wave beamforming.

Operations 800 may be implemented as software components that are executed and run on one or more processors (e.g., controller/processor 280 of FIG. 2). Further, the transmission and reception of signals by the remote UE in operations 600 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280) obtaining and/or outputting signals.

The operations 800 may begin, at block 810, by providing an indication of beam training sequences associated with a first frequency range (such as FR2) to a second UE, said sequences being used for beam training. At 820, the Rx UE indicates a capability associated with a second frequency range (such as FR1) to the second UE.

In certain aspects, the sequences such as reference signal sequences include a first set of sequences indicating the first UE capable of operating over the first frequency range and not capable of operating over the second frequency range. Possible beam training sequences that are used are divided into two mutually exclusive sets. This is known as a default setting or indicated by some network entity like gNB or RSU etc. If the BT-RS transmitted by the UE and generated based on a sequence belonging to the first set, it will indicate that this UE has standalone FR2 capabilities, i.e., it does not have the capability to communicate over FR1. If the BT-RS transmitted by the UE and generated based on a sequence belonging to the second set, this implies that this UE has both FR1 and FR2 capabilities. More generally, if multiple bands are supported then the BT-RS sequences are grouped in multiple sets, where each set indicates support of one of the other band or a combination of bands.

In certain aspects, the sequences include a second set of sequences not overlapping with and instead of the first set of the sequences. The second set of the sequences indicate the first UE capable of operating over both the first frequency range and the second frequency range. The sequence may either be selected from the first set if it can only support the first frequency range or from the second set if it supports both the first and the second frequency range. For example, the second set of the sequences may include one or more subsets of sequences, wherein the first UE is capable of operating over a frequency range corresponding to at least one of the one or more subsets of the sequences. The operation of the first UE over the frequency range corresponding to at least one of the one or more subset of the sequences is independent of any additional beam training.

Figure 9:
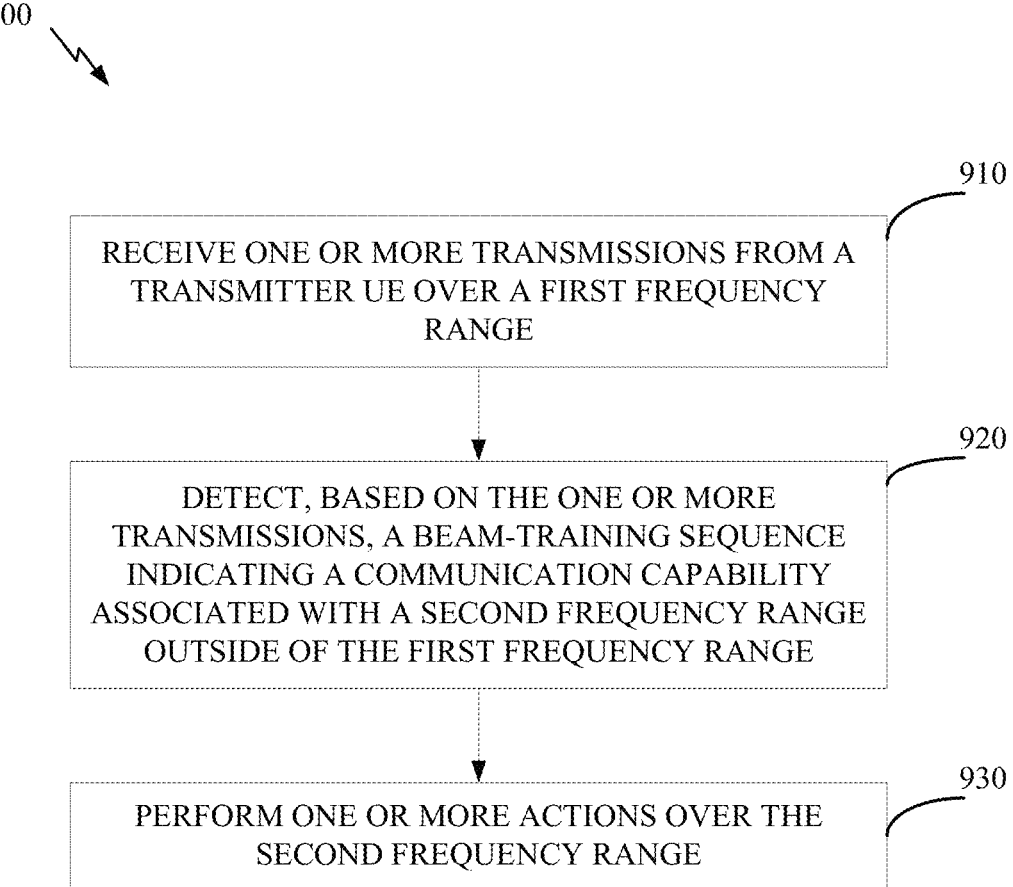
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by an Rx UE (e.g., such as the Rx UE in FIG. 5). The operations 900 may be complementary to the operations 700 of FIG. 7 when the Tx UE and the Rx UE discovers each other in sidelink using mm wave beamforming.

Operations 900 may be implemented as software components that are executed and run on one or more processors (e.g., controller/processor 290 of FIG. 2). Further, the transmission and reception of signals by the remote UE in operations 600 may be enabled, for example, by one or more antennas (e.g., antennas 252 of FIG. 2). In certain aspects, the transmission and/or reception of signals by the remote UE may be implemented via a bus interface of one or more processors (e.g., controller/processor 290) obtaining and/or outputting signals.

The operations 900 may begin, at block 910, by receiving one or more transmissions from a transmitter UE over a first frequency range (e.g., FR2). At 920, the Rx UE detects, based on the one or more transmissions, a beam-training sequence indicating a communication capability associated with a second frequency range (e.g., FR1) outside of the first frequency range. At 930, the Rx UE performs one or more actions over the second frequency range. For example, the one or more actions may include transmitting a discovery message over the second frequency range after the detection. In certain aspects, the transmission of the discovery message is prioritized over the second frequency range over performing discovery in the first frequency range.

In certain aspects, the Rx UE detects whether there is any degradation associated with a communication in the first frequency range. After detecting the degradation, the Rx UE may transmit a discovery message over the second frequency range regarding the first frequency range. The Rx UE may transmit a discovery message regarding the first frequency range over the second frequency range and create, after the transmission of the discovery message, a backup link for potential wireless communications over the first frequency range. In certain aspects, the Rx UE may detect the BT-RS over the first frequency range. The BT-RS may have a received power level lower than a threshold level.

Figure 10:
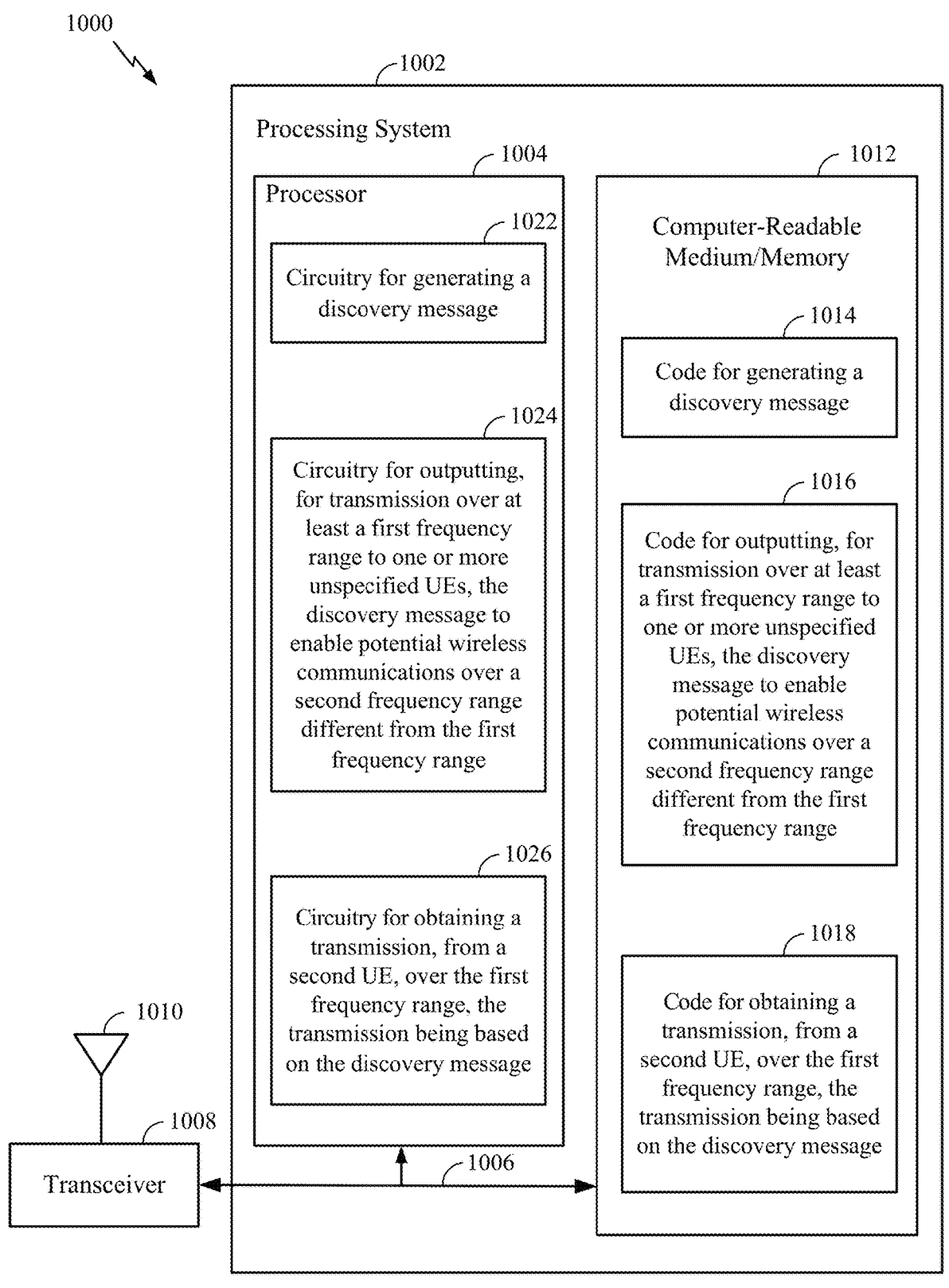
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7. In certain aspects, computer-readable medium/memory 1012 stores code 1014 for generating a discovery message, code 1016 for transmitting, over at least a first frequency range to one or more unspecified UEs, the discovery message to enable potential wireless communications over a second frequency range different from the first frequency range, and code 1018 for obtaining a transmission, from a second UE, over the first frequency range, the transmission being based on the discovery message. In certain aspects, the processor 1004 has circuitry configured to implement the code stored in the computer-readable medium/memory 1012. The processor 1004 includes circuitry 1022 for generating a discovery message; circuitry 1024 for transmitting, over at least a first frequency range to one or more unspecified UEs, the discovery message to enable potential wireless communications over a second frequency range different from the first frequency range; and circuitry 1026 for obtaining a transmission, from a second UE, over the first frequency range, the transmission being based on the discovery message.

Figure 11:
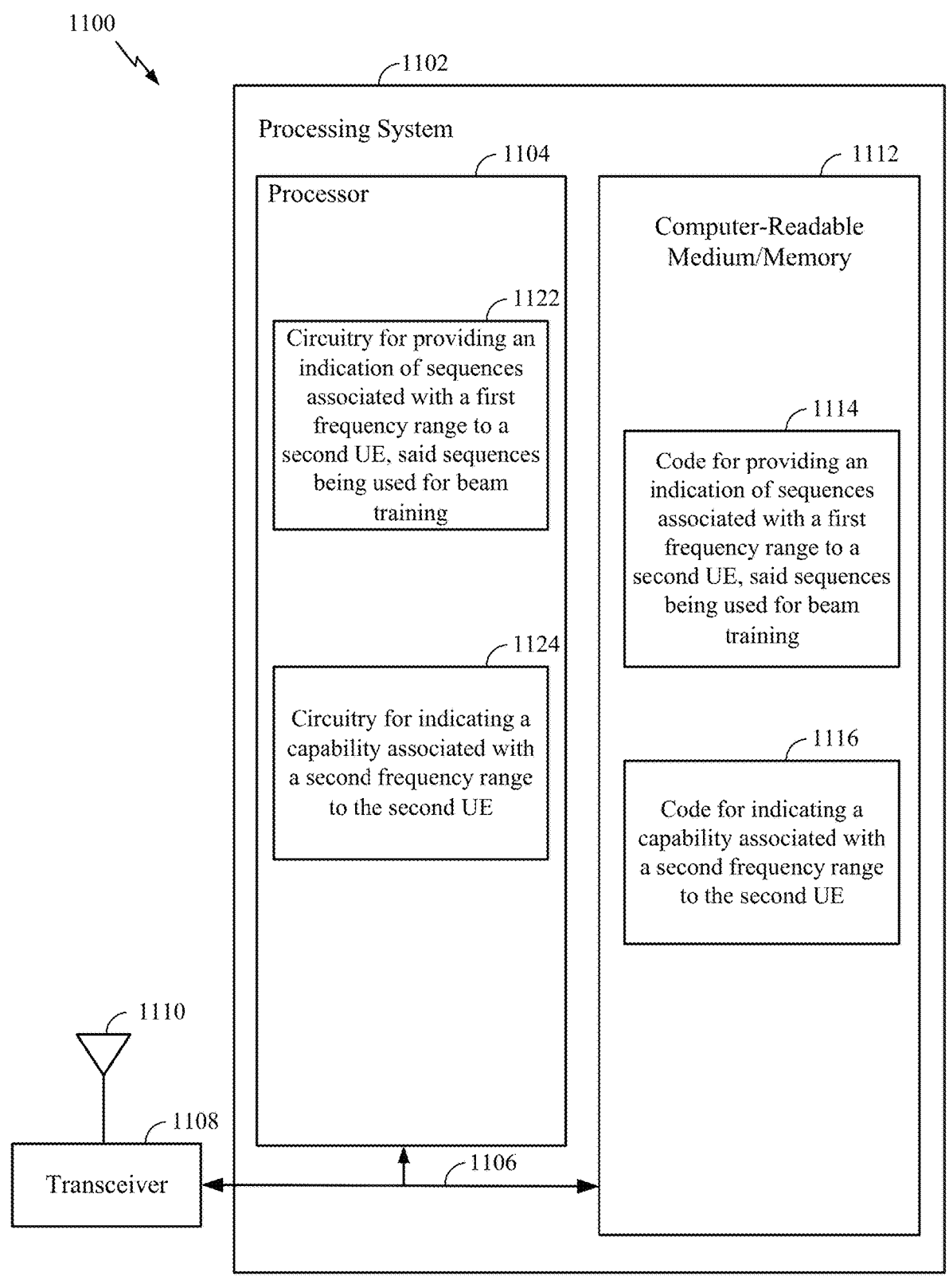
FIG. 11 illustrates a communications device that may include various components configured to perform operations for the techniques disclosed herein.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8. In certain aspects, computer-readable medium/memory 1112 stores code 1114 for providing an indication of sequences associated with a first frequency range to a second UE, and code 1116 for indicating a capability associated with a second frequency range to the second UE. In certain aspects, the processor 1104 has circuitry configured to implement the code stored in the computer-readable medium/memory 1112. The processor 1104 includes circuitry 1122 for providing an indication of sequences associated with a first frequency range to a second UE; and circuitry 1124 for indicating a capability associated with a second frequency range to the second UE.

Figure 12:
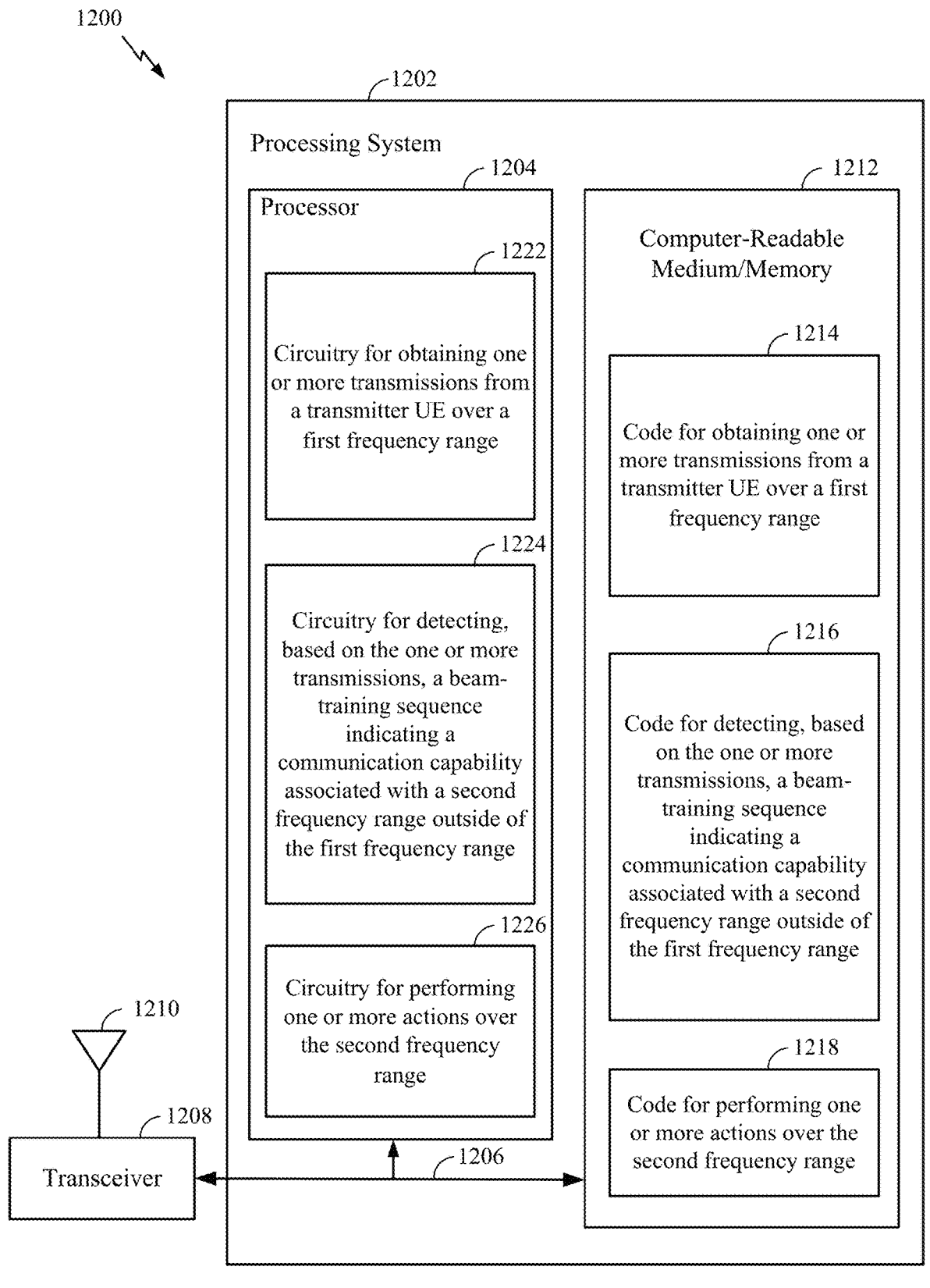
FIG. 12 illustrates a communications device that may include various components configured to perform operations for the techniques disclosed herein.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9. In certain aspects, computer-readable medium/memory 1212 stores code 1214 for obtaining one or more transmissions from a transmitter UE over a first frequency range; code 1216 for detecting, based on the one or more transmissions, a beam-training sequence indicating a communication capability associated with a second frequency range outside of the first frequency range; and code 1218 for performing one or more actions over the second frequency range. In certain aspects, the processor 1204 has circuitry configured to implement the code stored in the computer-readable medium/memory 1212. The processor 1204 includes circuitry 1222 for obtaining one or more transmissions from a transmitter UE over a first frequency range; circuitry 1224 for detecting, based on the one or more transmissions, a beam-training sequence indicating a communication capability associated with a second frequency range outside of the first frequency range; and circuitry 1226 for performing one or more actions over the second frequency range.

In addition to the various aspects described above, aspects of specific combinations are within the scope of the disclosure, some of which are detailed below:

Aspect 1: A method for wireless communications by a first user equipment (UE), comprising: generating a discovery message; transmitting, over at least a first frequency range to one or more unspecified UEs, the discovery message to enable potential wireless communications over a second frequency range different from the first frequency range; and receiving a transmission, from a second UE, over the first frequency range, the transmission being based on the discovery message.

Aspect 2: The method of Aspect 1, wherein the transmission is based on the second UE discovering the first UE using the discovery message.

Aspect 3: The method of any one of Aspects 1-2, wherein the discovery message includes a device identifier (ID) of the first UE.

Aspect 4: The method of any one of Aspects 1-3, wherein generating the discovery message comprises including an indication that requests a notification about at least one of beam training sequence or one or more beam training occasions in a response from the second UE.

Aspect 5: The method of any one of Aspects 1-4, wherein generating the discovery message comprises including a random access channel (RACH) sequence to be used for beam training over the second frequency range.

Aspect 6: The method of any one of Aspects 1-5, further comprising accepting one or more discovery announcements similar to the discovery message after beam training to accommodate standalone devices.

Aspect 7: The method of any one of Aspects 1-6, further comprising receiving enhanced discovery information about the second frequency range from one or more unspecified UEs.

Aspect 8: The method of any one of Aspects 1-7, wherein the second UE is one of the one or more unspecified UEs.

Aspect 9: The method of any one of Aspects 1-8, wherein generating the discovery message comprises including information regarding at least one of one or more beam training sequences or one or more beam training occasions for one or more beam training periods.

Aspect 10: The method of any one of Aspects 1-9, further comprising: receiving a set of beam training sequences from the second UE; and communicating with the second UE based on the set of received beam training sequences.

Aspect 11: The method of any one of Aspects 1-10, further comprising transmitting, to the second UE, an indication of a random access channel (RACH) sequence to be used for beam training over the second frequency range.

Aspect 12: The method of any one of Aspects 1-11, further comprising receiving a second transmission from a discovered UE , wherein the discovered UE has completed beam training with the first UE independent of the discovery message.

Aspect 13: The method of Aspect 11, wherein the discovery announcement includes additional information relevant to one or more unspecified UEs post beam training.

Aspect 14: A method for wireless communications by a first UE, comprising: providing an indication of sequences associated with a first frequency range to a second UE, said sequences being used for beam training; and indicating a capability associated with a second frequency range to the second UE.

Aspect 15: The method of Aspect 14, wherein the sequences include a first set of sequences indicating the first UE capable of operating over the first frequency range and not capable of operating over the second frequency range.

Aspect 16: The method of any one of Aspects 14-15, wherein the beam training sequences include a second set of sequences not overlapping with and instead of the first set of the sequences, the second set of the sequences indicating the first UE capable of operating over both the first frequency range and the second frequency range.

Aspect 17: The method of Aspect 16, wherein the second set of the sequences includes one or more subsets of sequences, wherein the first UE is capable of operating over a frequency range corresponding to at least one of the one or more subsets of the sequences.

Aspect 18: The method of Aspect 17, wherein the operation of the first UE over the frequency range corresponding to at least one of the one or more subset of the sequences is independent of any additional beam training.

Aspect 19: A method for wireless communications by a receiver UE, comprising: receiving one or more transmissions from a transmitter UE over a first frequency range; detecting, based on the one or more transmissions, a beam-training sequence indicating a communication capability associated with a second frequency range outside of the first frequency range; and performing one or more actions over the second frequency range.

Aspect 20: The method of Aspect 19, further comprising: detecting whether there is any degradation associated with a communication in the first frequency range; and after detecting the degradation, transmitting a discovery message over the second frequency range regarding the first frequency range.

Aspect 21: The method of any one of Aspects 19-20, further comprising: transmitting a discovery message regarding the first frequency range over the second frequency range; and creating, after the transmission of the discovery message, a backup link for potential wireless communications over the first frequency range.

Aspect 22: The method of any one of Aspects 19-21, further comprising detecting the beam-training sequence over the first frequency range, the beam-training sequence having a received power level lower than a threshold level.

Aspect 23: The method of Aspect 22, wherein the one or more actions comprise transmitting a discovery message over the second frequency range after the detection.

Aspect 24: The method of Aspect 23, further comprising: prioritizing the transmission of the discovery message over the second frequency range over performing discovery in the first frequency range.

Aspect 25: A first user equipment (UE), comprising: a processing system configured to generate a discovery message; a transmitter configured to transmit, over at least a first frequency range to one or more unspecified UEs, the discovery message to enable potential wireless communications over a second frequency range different from the first frequency range; and a receiver configured to receive a transmission, from a second UE, over the first frequency range, the transmission being based on the discovery message.

Aspect 26: A first UE, comprising: a transmitter configured to transmit an indication of beam training sequences associated with a first frequency range to a second UE, said sequences being used for beam training; and a processing system configured to indicate a capability associated with a second frequency range to the second UE.

Aspect 27: A receiver UE, comprising: a receiver configured to receive one or more transmissions from a transmitter UE over a first frequency range; and a processing system configured to detect, based on the one or more transmissions, a beam-training sequence indicating a communication capability associated with a second frequency range outside of the first frequency range and perform one or more actions over the second frequency range.

Aspect 28: A first user equipment (UE), comprising: means for generating a discovery message; means for transmitting, over at least a first frequency range to one or more unspecified UEs, the discovery message to enable potential wireless communications over a second frequency range different from the first frequency range; and means for receiving a transmission, from a second UE, over the first frequency range, the transmission being based on the discovery message.

Aspect 29: A first UE, comprising: means for transmitting an indication of beam training sequences associated with a first frequency range to a second UE, said sequences being used for beam training; and means for indicating a capability associated with a second frequency range to the second UE.

Aspect 30: A receiver UE, comprising: means for receiving one or more transmissions from a transmitter UE over a first frequency range; means for detecting, based on the one or more transmissions, a beam-training sequence indicating a communication capability associated with a second frequency range outside of the first frequency range; and means for performing one or more actions over the second frequency range.

Aspect 31: An apparatus for wireless communications by a first user equipment (UE), comprising: a processing system configured to generate a discovery message; and an interface configured to output the discovery message, for transmission over at least a first frequency range to one or more unspecified UEs, to enable potential wireless communications over a second frequency range different from the first frequency range and obtain a transmission from a second UE, over the first frequency range, the transmission being based on the discovery message.

Aspect 32: An apparatus for wireless communications by a first UE, comprising: an interface configured to provide an indication of sequences associated with a first frequency range to a second UE, said sequences being used for beam training; and a processing system configured to indicate a capability associated with a second frequency range to the second UE.

Aspect 33: An apparatus for wireless communications by a receiver UE, comprising: an interface configured to obtain one or more transmissions from a transmitter UE over a first frequency range; and a processing system configured to detect, based on the one or more transmissions, a beam-training sequence indicating a communication capability associated with a second frequency range outside of the first frequency range and perform one or more actions over the second frequency range.

Aspect 34: A computer-readable medium for wireless communications by a first user equipment (UE), comprising codes executable to: generate a discovery message; output the discovery message, for transmission over at least a first frequency range to one or more unspecified UEs, to enable potential wireless communications over a second frequency range different from the first frequency range; and obtain a transmission from a second UE, over the first frequency range, the transmission being based on the discovery message.

Aspect 35: A computer-readable medium for wireless communications by a first UE, comprising codes executable to: provide an indication of sequences associated with a first frequency range to a second UE, said sequences being used for beam training; and indicate a capability associated with a second frequency range to the second UE.

Aspect 36: A computer-readable medium for wireless communications by a receiver UE, comprising codes executable to: obtain one or more transmissions from a transmitter UE over a first frequency range; detect, based on the one or more transmissions, a beam-training sequence indicating a communication capability associated with a second frequency range outside of the first frequency range; and perform one or more actions over the second frequency range.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120 and/or processors 220, 230, 238, and/or controller/processor 240 of the BS 110 shown in FIG. 2 may be configured to perform operations 700 of FIG. 7, operations 800 of FIG. 8 and/or operations 900 of FIG. 9.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for generating, means for detecting, means for including, means for accepting, means for communicating, means for providing, means for creating, means for prioritizing, means for performing, and means for indicating may include a processing system, which may include one or more processors, such as processors 258, 264 and 266, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first user equipment (UE), comprising:
   transmitting, via at least a first frequency range and to one or more unspecified UEs, a discovery message to enable sidelink wireless communications via a second frequency range different from the first frequency range, wherein the discovery message comprises:
   an indication of a random access channel (RACH) sequence to be used for beam training via the second frequency range, and
   an indication that requests a notification about at least one of beam training sequences or one or more beam training occasions; and
   receiving, via the first frequency range and from the one or more unspecified UEs, a transmission, the transmission including a response that indicates the at least one of the beam training sequences or the one or more beam training occasions.

2. The method of claim 1, wherein the discovery message includes a device identifier (ID) of the first UE.

3. The method of claim 1, further comprising accepting one or more discovery announcements similar to the discovery message to accommodate standalone devices.

4. The method of claim 1, further comprising receiving, from the one or more unspecified UEs, enhanced discovery information about the second frequency range.

5. The method of claim 1, further comprising:
receiving a set of beam training sequences from the one or more unspecified UEs; and
communicating with the one or more unspecified UEs based on the set of the beam training sequences.

6. The method of claim 1, further comprising receiving a second transmission from a discovered UE after the first UE has completing beam training with the discovered UE independent of the discovery message.

7. The method of claim 1, wherein the discovery message further comprises a discovery announcement, and wherein the discovery announcement includes additional information relevant to the one or more unspecified UEs post beam training.

8. A method for wireless communications at a first user equipment (UE), comprising:
providing an indication of sequences associated with a first frequency range to a second UE, said sequences being used for beam training;
selecting, from a first set of sequences, at least one of the sequences to indicate a capability, wherein the first set of sequences indicate the first UE is capable of operating over the first frequency range and not capable of operating over a second frequency range; and
indicating, via the at least one of the sequences and to the second UE, the capability, wherein indicating the capability includes using the at least one of the sequences as a signature to indicate the capability.

9. The method of claim 8, wherein the sequences include a second set of sequences not overlapping with and instead of the first set of the sequences, the second set of the sequences indicating the first UE is capable of operating via both the first frequency range and the second frequency range.

10. The method of claim 9, wherein the second set of the sequences includes one or more subsets of sequences, wherein the first UE is capable of operating via a frequency range corresponding to at least one of the one or more subsets of the sequences.

11. The method of claim 10, wherein operation of the first UE via the frequency range corresponding to at least one of the one or more subsets of the sequences is independent of any additional beam training.

12. A method for wireless communications by a receiver user equipment (UE), comprising:
receiving one or more transmissions from a transmitter UE via a first frequency range;
detecting, based on the one or more transmissions, a beam training sequence indicating a communication capability associated with a second frequency range outside of the first frequency range, wherein the beam training sequence is used as a signature to indicate the communication capability; and
performing one or more actions via the second frequency range, wherein the one or more actions comprise transmitting a discovery message via the second frequency range in response to the detection.

13. The method of claim 12, further comprising:
detecting whether there is any degradation associated with a communication in the first frequency range; and
after detecting the degradation, transmitting a discovery message via the second frequency range regarding the first frequency range.

14. The method of claim 12, further comprising:
transmitting a discovery message regarding the first frequency range via the second frequency range; and
creating, after the transmission of the discovery message, a backup link for potential wireless communications via the first frequency range.

15. The method of claim 12, further comprising detecting the beam training sequence via the first frequency range, the beam training sequence having a received power level lower than a threshold level.

16. The method of claim 12, further comprising:
prioritizing the transmission of the discovery message via the second frequency range over performing discovery in the first frequency range.

17. A user equipment (UE), comprising:
a transceiver;
memory comprising executable instructions; and
one or more processors, individually or in any combination, configured to execute the executable instructions and cause the UE to:
transmit, via the transceiver, via at least a first frequency range, and to one or more unspecified UEs, a discovery message to enable wireless communications via a second frequency range different from the first frequency range, wherein the discovery message comprises:
an indication of a random access channel (RACH) sequence to be used for beam training via the second frequency range, and
an indication that requests a notification about at least one of beam training sequences or one or more beam training occasions; and
receive, via the first frequency range, via the transceiver, and from the one or more unspecified UEs, a transmission, the transmission including a response that indicates the at least one of the beam training sequences or the one or more beam training occasions.

18. The UE of claim 17, wherein the discovery message includes a device identifier (ID) of the UE.

19. The UE of claim 17, wherein the one or more processors are further configured to cause the UE to accept one or more discovery announcements similar to the discovery message to accommodate standalone devices.

20. The UE of claim 17, wherein the one or more processors are further configured to cause the UE to receive, from the one or more unspecified UEs and via the transceiver, enhanced discovery information about the second frequency range.

21. The UE of claim 17, wherein the one or more processors are further configured to cause the UE to:
receive, via the transceiver, a set of beam training sequences from the one or more unspecified UEs; and
communicate, via the transceiver, with the one or more unspecified UEs based on the set of the beam training sequences.

22. The UE of claim 17, wherein the one or more processors are further configured to cause the UE to receive, via the transceiver, a second transmission from a discovered UE after the UE has completing beam training with the discovered UE independent of the discovery message.

23. The UE of claim 17, wherein the discovery message further comprises a discovery announcement, and wherein the discovery announcement includes additional information relevant to the one or more unspecified UEs post beam training.

* * * * *